Aug. 27, 1946. O. RASOR 2,406,636
DETACHABLE COVER FOR CONTAINERS
Filed May 24, 1944 2 Sheets-Sheet 1

Inventor
Orval Rasor
by
Attorney

Aug. 27, 1946.　　　　O. RASOR　　　　2,406,636
DETACHABLE COVER FOR CONTAINERS
Filed May 24, 1944　　　　2 Sheets-Sheet 2
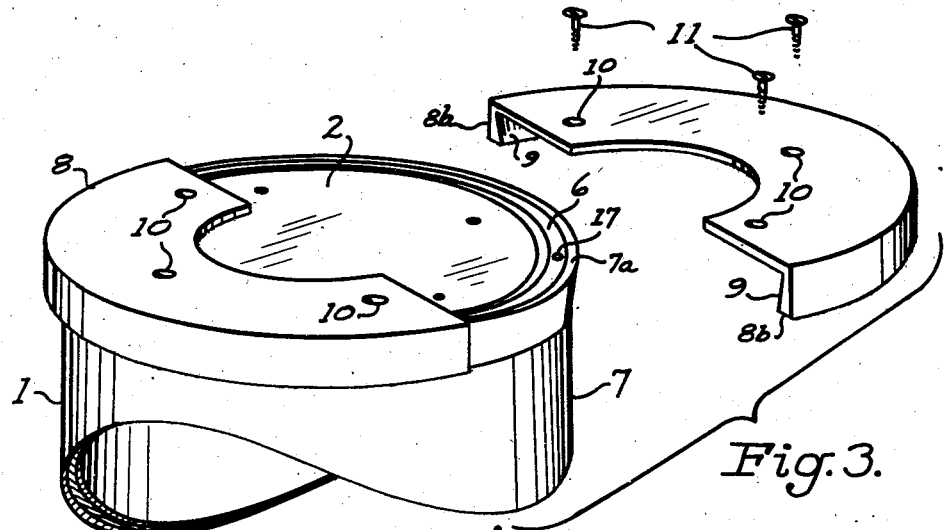
Fig. 3.
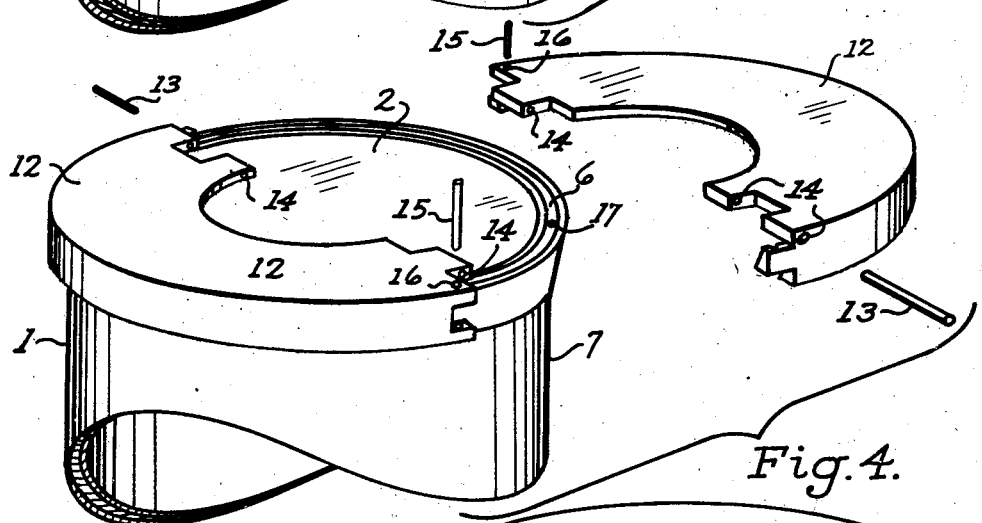
Fig. 4.
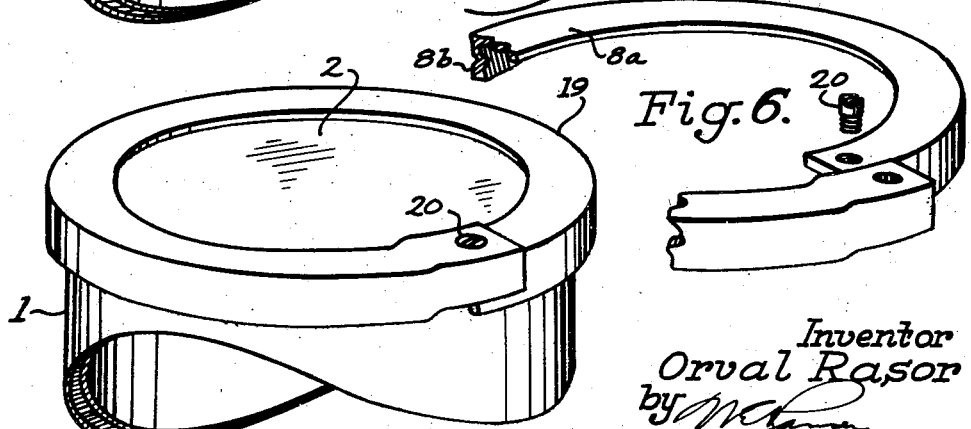
Fig. 5.
Fig. 6.
Inventor
Orval Rasor
by
Attorney Patented Aug. 27, 1946

2,406,636

UNITED STATES PATENT OFFICE 2,406,636

DETACHABLE COVER FOR CONTAINERS

Orval Rasor, Portland, Oreg.

Application May 24, 1944, Serial No. 537,113

7 Claims. (Cl. 217—79)

My invention relates to wooden containers, such, for example, as barrels, tubs and the like, provided with removable tops or end members. Said containers normally are filled with material, and the end member is then secured in place. It is necessary that said end member be fitted tightly in place to prevent spilling, and yet it is desirable that said end member be removable without injuring, substantially, the side of said container.

In a co-pending application for patent, entitled Tubular construction, which matured into United States Patent No. 2,380,549, issued to me under date of July 17, 1945, I describe and illustrate types of containers in which the end member may be fitted and secured tightly in place, but I do not illustrate how said end member can be removed without destroying or injuring the marginal edges of the side member.

This latter result may be attained by making the fastening device separable from the end of the container and preferably in separate pieces secured to said end and overlying a wedge-shaped annular member adapted to be driven into the end of the cylindrical member. The peripheral edge of the end member is tapered, as is the inner face of the opposed lateral flange of the fastening device, and the wedge is adapted to split the end of the side member of the container to force the split portions laterally against said tapered faces and to lock the end member in place. The overlying fastening device can be secured by screws, bolts or other devices.

When it is desired to remove the end of said container, this may be accomplished by removing said fastening device, lifting the annular wedge from said position and forcing the split portions of the side wall more or less into their original positions to permit the end to be removed.

Further details of my invention and features thereof are hereinafter described in greater detail and with reference to the accompanying drawings, in which:

Fig. 3 is a fragmentary view of one end of such container, with one piece of the annular fastening ring shown laterally displaced;

Fig. 4 is a view similar to Fig. 3 of a modification of my invention;

Fig. 5 is a further view similar to Fig. 3 of a still further modification of my invention, but with the fastening ring shown seated in position; and Fig. 6 is a perspective view of such latter modified type of fastening ring, shown in the broken section.

A fastening device embodying my invention is adapted for use with a tubular container 1, having a removable end member 2. When I refer to the container as tubular, I do not wish to be limited to one which is of circular section, but merely use this term to indicate that it is a complete container adapted to enclose a space of substantial capacity.

Figure 1:
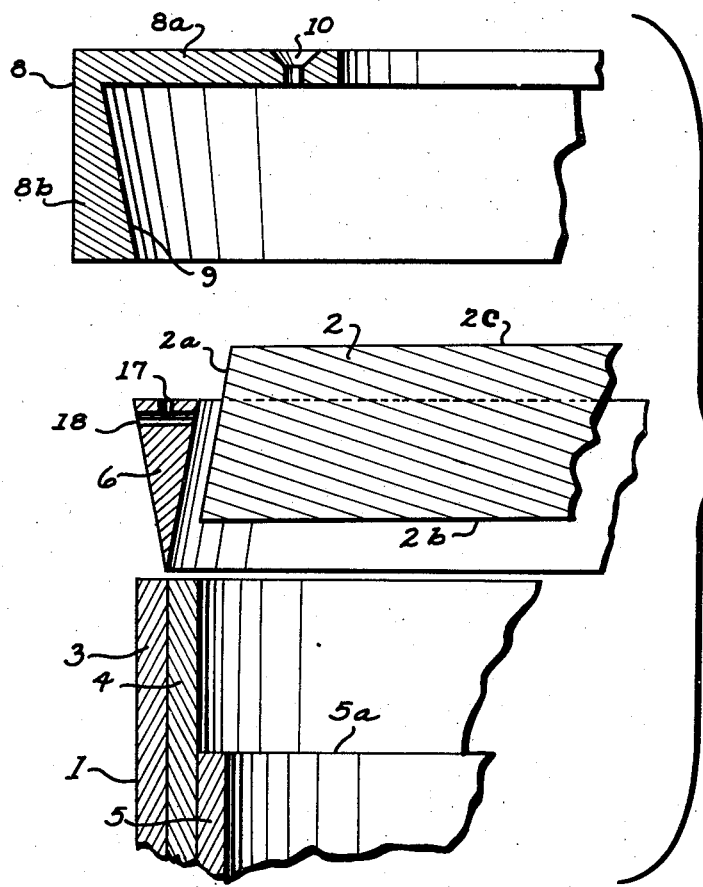
Fig. 1 is a fragmentary view of a portion of a container, its removable end, an annular wedge and ring, said parts being shown in superimposed relation.
Figure 2:
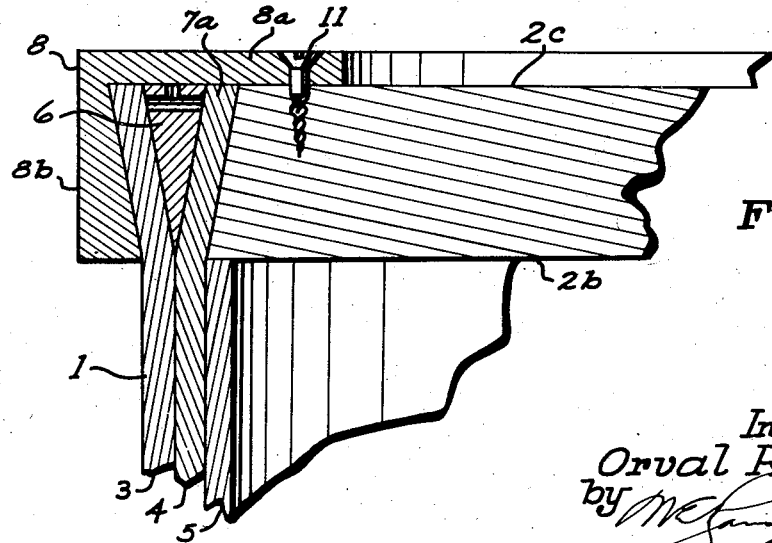
Fig. 2 is a similar fragmentary view of said parts as they are arranged to hold the end of the container tightly in place in the side portion thereof.

My invention is particularly adapted for use with a container made of laminated wood, such as plywood, in which the separate plies are joined together by some adhesive or cementitious material, such, for example, as a glue or resin. Said container is illustrated as comprising three plies 3, 4 and 5—3 being the outermost ply, 4 being the intermediate ply and 5 being the inner ply. The first two plies are of substantially the same length, and the inner ply, adjacent the end member 2, is shorter by the thickness of said end member, as is shown in Fig. 2. Thus, when the end member is in place, it lies flush with the upper edges of said plies 3 and 4. That is, the upper end 5a of the inner ply forms a shoulder upon which the inner face of the end member may rest—that is, against which it may seat. The periphery 2a of the end member is tapered, sloping inwardly from the inner face 2b of said end member toward the outer face 2c thereof.

An annular wedge 6 is adapted to be driven into the end 7a of the side wall 7 of said container, and preferably at the point of joinder between the plies 3 and 4. When said wedge is driven into position, it separates said plies at said point, and thus spreads them laterally, as is shown in Fig. 2. The fastening ring with which my invention is particularly concerned comprises two or more pieces 8, each of which is provided with an inwardly extending flange 8a and a lateral flange 8b. The inwardly extending flange is preferably plane, and fits across the end 7a of the container and across the outer face of the end member 2. The inner face 9 of flange 8b tapers at an angle, preferably equal in degree to the taper of the periphery 2a of the end member, but oppositely sloped. The taper of wedge 6 is complementary to the angle of said inner face and said periphery, so that when the parts are arranged as is shown in Fig. 2, there is no play. Thus, the end member fits tightly against the inner surface of the side wall, and the fastening ring fits tightly over said end member and about the upper margins of said side wall.

When a fastening ring of this character is used, it is customary to tack the two pieces 8 temporarily together by a strap or similar device, so as to maintain the annular form thereof. This is accomplished by securing said straps or other temporary fastening device through holes 10, which latter serve to hold screws 11 for securing said fastening device to the end member 2. I have not shown such temporary straps or fastening device in the drawings, as the form and character thereof will readily be apparent to a person skilled in the art.

In Fig. 4 I illustrate a modified type of fastening device, also comprising two separable pieces 12 which are complementary and interchangeable. Said pieces may be secured together by pins 13, one of which is shown in said Fig. 4, and which pins are adapted to pass through holes 14 which register when the parts are brought into juxtaposition. When the fastening ring and wedge are forced into position, said parts may further be held together by pins 15 adapted to seat in holes 16, extending normal to the holes 14.

In each of the embodiments illustrated it is desirable to have some means for engaging the annular wedge 6 to lift it from position when the wedge is to be withdrawn. One such arrangement is to have holes 17 opening to the head of said wedge, said holes communicating with other holes 18, respectively, arranged normal thereto. Thus, a hook-shaped lifting device may be inserted therein to lift the wedge to permit the laterally spread upper end of the plies to be rearranged in abutment with each other to permit the removal of the end member 2 of the tubular container after the fastening device is removed.

In Figs. 5 and 6 I show a still further modification of my invention in which said fastening ring 19 may be in one piece. The fastening ring preferably is made of some elastic material, such as lightweight steel, and the ends may overlap, as is shown in said figures, and be held in overlapped position by a set screw 20. In this modification an annular wedge is driven in place in the same manner as in the previous embodiments and may be removed by backing out said set screw and springing the ends apart, as is shown in Fig. 6, so that said fastening ring may be lifted from place.

In all of the modifications, said fastening elements are seated in similar manner to drive an annular wedge into position to lock the end members and the side members of the container. In this operation the fastening ring is arranged to bear on the upper or head of the wedge and the point of the wedge is arranged at the point of joinder between plies 3 and 4. Then the fastening ring can be struck sharp blows to drive the wedge into position and to fit the fastening ring tightly about the upper margins of the side of the container until the parts are arranged as is shown in Fig. 2. Fastening devices, if they are used, may then be fitted in place, and the container be sealed tightly.

When the container is to be opened, the device joining the fastening ring to the top or the pieces thereof or to each other may be withdrawn so that the ring can be removed. Thereafter, the annular wedge may be lifted from place, the upper marginal edges of the container and, particularly, the upper edge of ply 4 may be straightened out, so that the periphery of the end member will clear. The end member may then be lifted from place, and if it is desired to re-use said container, it may be done, because the parts are substantially undamaged.

Although, in this specification, I have referred to said container as being made of plywood and have illustrated the container as being constructed in this manner, I wish it understood that I do not wish to be limited to use with plywood containers, because containers made of solid wood may be similarly seated, although with greater difficulty because the containers do not split cleanly as do plywood sections at their points of joinder with adjacent plies.

I claim:

1. A fastening device for a tubular wooden container having a removable end member and a cylindrical side, an annular end ring having an inwardly extending flange and a lateral flange joined therewith, an annular wedge member adapted to split one end of said cylindrical side and to be seated therein, the periphery of said end member and the inner surface of the lateral flange of the end ring diverging toward the inwardly extending flange of the end ring, whereby said wedge member may first be alined with the end of the cylindrical side with the end ring in place, overlying said wedge, side and end members of the container and bearing on the wedge, and said wedge may be driven in place to lock the end member of said container and the side member thereof by splitting the end of said side member and forcing the split portions thereof laterally against the diverging portions of the lateral flange of the end ring and the end member of the container, respectively.

2. A fastening device for a tubular wooden container having a removable end member and a cylindrical side, an annular end ring comprising separable pieces having an inwardly extending flange and a lateral flange joined therewith, an annular wedge member adapted to split one end of said cylindrical side and to be seated therein, the periphery of said end member and the inner surface of the lateral flange of the end ring diverging toward the inwardly extending flange of the end ring, whereby said wedge member may first be alined with the end of the cylindrical side with the end ring in place, overlying said wedge, side and end members of the container and bearing on the wedge, and said wedge may be driven in place to lock the end member of said container and the side member thereof by splitting the end of said side member and forcing the split portions thereof laterally against the diverging portions of the lateral flange of the end ring and the end member of the container, respectively.

3. A fastening device for a tubular wooden container having a removable end member and a cylindrical side, an annular end ring having an inwardly extending flange and a lateral flange joined therewith, an annular wedge member adapted to split one end of said cylindrical side and to be seated therein, the periphery of said end member and the inner surface of the lateral flange of the end ring diverging at substantially equal, but opposite, angles toward the inwardly extending flange of the end ring, the angle of said wedge being substantially complementary thereto, whereby said wedge member may first be alined with the end of the cylindrical side with the end ring in place, overlying said wedge, side and end members of the container and bearing on the wedge, and said wedge may be driven in place to lock the end member of said container and the side member thereof by splitting the end of said side member and forcing the split portions thereof laterally against the diverging portions of the lateral flange of the end ring and the end member of the container, respectively.

4. A fastening device for a tubular wooden container having a removable end member and a cylindrical side, an annular end ring having an inwardly extending flange and a lateral flange joined therewith, an annular wedge member adapted to split one end of said cylindrical side and to be seated therein, the periphery of said end member and the inner surface of the lateral flange of the end ring diverging toward the inwardly extending flange of the end ring, whereby said wedge member may first be alined with the end of the cylindrical side with the end ring in place, overlying said wedge, side and end members of the container and bearing on the wedge, and said wedge may be driven in place to lock the end member of said container and the side member thereof by splitting the end of said side member and forcing the split portions thereof laterally against the diverging portions of the lateral flange of the end ring and the end member of the container, respectively, and means for detachably securing said ring to said end member.

5. A fastening device for a tubular wooden container having a removable end member and a cylindrical side, an annular end ring having an inwardly extending flange and a lateral flange joined therewith, an annular wedge member adapted to split one end of said cylindrical side and to be seated therein, the periphery of said end member and the inner surface of the lateral flange of the end ring diverging toward the inwardly extending flange of the end ring, whereby said wedge member may first be alined with the end of the cylindrical side with the end ring in place, overlying said wedge, side and end members of the container and bearing on the wedge, and said wedge may be driven in place to lock the end member of said container and the side member thereof by splitting the end of said side member and forcing the split portions thereof laterally against the diverging portions of the lateral flange of the end ring and the end member of the container, respectively, and means joined to said end member for detachably securing said ring to said end member.

6. A fastening device for a tubular wooden container having a removable end member and a cylindrical side, an annular end ring comprising separable pieces having an inwardly extending flange and a lateral flange joined therewith, an annular wedge member adapted to split one end of said cylindrical side and to be seated therein, the periphery of said end member and the inner surface of the lateral flange of the end ring diverging toward the inwardly extending flange of the end ring, whereby said wedge member may first be alined with the end of the cylindrical side with the end ring in place, overlying said wedge, side and end members of the container and bearing on the wedge, and said wedge may be driven in place to lock the end member of said container and the side member thereof by splitting the end of said side member and forcing the split portions thereof laterally against the diverging portions of the lateral flange of the end ring and the end member of the container, respectively, and means detachably securing the pieces of said annular end ring members together.

7. A fastening device for a tubular wooden container having a removable end member and a cylindrical side, an annular end ring comprising separable pieces having an inwardly extending flange and a lateral flange joined therewith, an annular wedge member adapted to split one end of said cylindrical side and to be seated therein, the periphery of said end member and the inner surface of the lateral flange of the end ring diverging at substantially equal, but opposite, angles toward the inwardly extending flange of the end ring, the angle of said wedge being substantially complementary thereto, whereby said wedge member may first be alined with the end of the cylindrical side with the end ring in place, overlying said wedge, side and end members of the container and bearing on the wedge, and said wedge may be driven in place to lock the end member of said container and the side member thereof by splitting the end of said side member and forcing the split portions thereof laterally against the diverging portions of the lateral flange of the end ring and the end member of the container, respectively, and means detachably securing the pieces of said annular end ring members together.

ORVAL RASOR.